(12) United States Patent
Chang et al.

(10) Patent No.: US 10,641,947 B2
(45) Date of Patent: May 5, 2020

(54) BACKLIGHT MODULE AND DISPLAY DEVICE

(71) Applicants: Radiant Opto-Electronics (Suzhou) Co.,Ltd., Jiangsu (CN); Radiant Opto-Electronics Corporation, Kaohsiung (TW)

(72) Inventors: Chung-Cheng Chang, Kaohsiung (TW); Pei-Fen Hou, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 180 days.

(21) Appl. No.: 15/942,569

(22) Filed: Apr. 2, 2018

(65) Prior Publication Data

US 2018/0321436 A1 Nov. 8, 2018

Related U.S. Application Data

(63) Continuation of application No. PCT/CN2017/082835, filed on May 3, 2017.

(51) Int. Cl.
*F21V 8/00* (2006.01)

(52) U.S. Cl.
CPC ......... *G02B 6/0088* (2013.01); *G02B 6/0065* (2013.01); *G02B 6/0051* (2013.01); *G02B 6/0053* (2013.01); *G02B 6/0068* (2013.01); *G02B 6/0073* (2013.01); *G02B 6/0093* (2013.01)

(58) Field of Classification Search
CPC ........................... G02B 6/0088; G02B 6/0065
USPC ........................................................ 362/607
See application file for complete search history.

(56) References Cited

U.S. PATENT DOCUMENTS

| 8,398,288 B1 * | 3/2013 | Lin ...................... G02B 6/0085 362/294 |
| 9,817,179 B2 * | 11/2017 | Azuma ............. G02F 1/133308 |
| 2004/0257791 A1 * | 12/2004 | Chen .................... G02B 6/0088 362/633 |
| 2006/0147175 A1 * | 7/2006 | Shinohara ............ G02B 6/0088 385/146 |

(Continued)

FOREIGN PATENT DOCUMENTS

| CN | 101297340 A | 10/2008 |
| CN | 103048820 A | 4/2013 |

(Continued)

*Primary Examiner* — Bryon T Gyllstrom
(74) *Attorney, Agent, or Firm* — CKC & Partners Co., LLC

(57) ABSTRACT

A backlight module and a display device are provided. The backlight module includes a back plate, a light guide plate, a first optical film, an adhesive member, a second optical film and a light source. The light guide plate is disposed in the back plate. The first optical film is disposed above the light guide plate, in which the first optical film has an elongated slot. One portion of the adhesive member is disposed in the elongated slot. The second optical film is disposed above or under the first optical film, and a portion of the second optical film overlaps the elongated slot of the first optical film so as to be adhered on the portion of the adhesive member which is located in the elongated slot. The light source is disposed on the back plate adjacent to a light-incident surface of the light guide plate.

19 Claims, 12 Drawing Sheets

FIG. 1

(56) References Cited

U.S. PATENT DOCUMENTS

| | | | | |
|---|---|---|---|---|
| 2008/0088767 A1* | 4/2008 | Chen | ............... | G02B 6/0018 |
| | | | | 349/58 |
| 2011/0277361 A1* | 11/2011 | Nichol | ............... | G02B 6/0018 |
| | | | | 40/541 |
| 2013/0155723 A1* | 6/2013 | Coleman | ............... | G02B 6/0018 |
| | | | | 362/621 |
| 2013/0279194 A1* | 10/2013 | Hodrinsky | ............... | G02B 6/24 |
| | | | | 362/612 |
| 2014/0168574 A1* | 6/2014 | Matsubara | ............... | G02F 1/133308 |
| | | | | 349/62 |
| 2015/0234116 A1* | 8/2015 | Azuma | ............... | G02B 6/0088 |
| | | | | 362/97.1 |
| 2017/0371094 A1* | 12/2017 | Lee | ............... | G02B 6/0088 |
| 2018/0106960 A1* | 4/2018 | Jung | ............... | G02B 6/0053 |
| 2019/0310414 A1* | 10/2019 | Itoh | ............... | G02B 6/009 |

FOREIGN PATENT DOCUMENTS

| | | |
|---|---|---|
| CN | 103676224 A | 3/2014 |
| CN | 205301764 U | 6/2016 |
| CN | 205427397 U | 8/2016 |
| CN | 206723914 U | 12/2017 |
| EP | 2607936 A1 | 6/2013 |
| JP | 2010205451 A | 9/2010 |
| JP | 2014219437 A | 11/2014 |
| TW | I579621 B | 4/2017 |

* cited by examiner

BACKLIGHT MODULE AND DISPLAY DEVICE

RELATED APPLICATIONS

This application is a continuation application of International Application No. PCT/CN2017/082835 filed May 3, 2017, which is incorporated herein by reference.

BACKGROUND

Field of Invention

The present invention relates to a light source module. More particularly, the present invention relates to a backlight module and its applications on a display device.

Description of Related Art

A conventional way to fix an optical film or a light guide plate on a mold frame is to dispose rectangular flange lugs on two sides of each of the light guide plate or the optical film, and to dispose recesses corresponding to the flange lugs on the mold frame. Therefore, the light guide plate and the optical film can be positioned in the mold frame by inserting the flange lugs into the recesses and the flange lugs can be adhered on the mold frame by using adhesives tape.

However, this structure does not meet the design trend of narrow border of a backlight module and a display device. Furthermore, the overall thickness of the backlight module and the display device is increased because of the use of the adhesives tapes adhered on the flange lugs and the mold frame.

SUMMARY

An object of the invention is to provide a backlight module and a display device to meet the design requirement of the narrow border display device.

According to the aforementioned object, the backlight module is provided. The backlight module includes a back plate, a light guide plate, a first optical film, an adhesive member, a second optical film and a light source. The light guide plate is disposed in the back plate. The first optical film is disposed above the light guide plate, in which the first optical film has an elongated slot. One portion of the adhesive member is disposed in the elongated slot. The second optical film is disposed above or under the first optical film, and a portion of the second optical film overlaps the elongated slot of the first optical film so as to be adhered on the portion of the adhesive member which is located in the elongated slot. The light source is disposed on the back plate adjacent to a light-incident surface of the light guide plate.

According to an embodiment of the present invention, the second optical film is disposed above the first optical film. The portion of the adhesive member located in the elongated slot is adhered to a bottom surface of the second optical film and a top surface of the light guide plate. The other portion of adhesive member is adhered to a bottom surface of the first optical film and the top surface of the light guide plate.

According to an embodiment of the present invention, the adhesive member has a first thickness and a second thickness, and the second thickness is greater than the first thickness, and the portion of the adhesive member with the second thickness is located in the elongated slot of the first optical film.

According to an embodiment of the present invention, a thickness of the first optical film is substantially equal to the second thickness minus the first thickness.

According to an embodiment of the present invention, the second optical film is disposed under the first optical film. The portion of the adhesive member located in the elongated slot is adhered to the top surface of the second optical film. The other portion of the adhesive member is adhered to a bottom surface of the first optical film and the top surface of the second optical film.

According to the aforementioned object, a display device is provided. The display device includes a backlight module and a display panel. The backlight module includes a back plate, a light guide plate, a first optical film, a first adhesive member, a second optical film and a light source. The light guide plate is disposed in the back plate. The first optical film is disposed above the light guide plate, in which the first optical film has an elongated slot. One portion of the first adhesive member is disposed in the elongated slot. The second optical film is disposed above or under the first optical film, and a portion of the second optical film overlaps the elongated slot of the first optical film so as to be adhered on the portion of the first adhesive member which is located in the elongated slot. The light source is disposed on the back plate adjacent to a light-incident surface of the light guide plate. The display panel is disposed in front of the light guide plate, the first optical film and the second optical film, in which the display panel is held on the back plate.

According to an embodiment of the present invention, the portion of the first adhesive member disposed in the elongated slot is adhered to a bottom surface of the second optical film and a top surface of the light guide plate. The other portion of the adhesive member is adhered to a bottom surface of the first optical film and the top surface of the second optical film.

According to an embodiment of the present invention, the first adhesive member has a first thickness and a second thickness, and the second thickness is greater than the first thickness, and the portion of the first adhesive member with the second thickness is located in the elongated slot of the first optical film.

According to an embodiment of the present invention, a thickness of the first optical film is substantially equal to the second thickness minus the first thickness.

According to an embodiment of the present invention, the backlight module further includes a third optical film, a fourth optical film and a second adhesive member. The third optical film is disposed above the second optical film. The fourth optical film disposed above the third optical film, in which the fourth optical film has an elongated slot. One portion of the second adhesive member is disposed in the elongated slot of the fourth optical film, and the second adhesive member is adhered to the third optical film and the fourth optical film. The elongated slot of the first optical film and the elongated slot of the fourth optical film are arranged along a side edge of the light guide plate and are alternatively disposed along a thickness direction of the light guide plate.

According to an embodiment of the present invention, the back plate further comprises a carrying portion which has a carrying surface, and the portion of the second adhesive member located in the elongated slot is adhered to a top surface of the third optical film and the carrying surface of the carrying portion. The other portion of the second adhesive member is adhered to a top surface of the fourth optical film.

According to an embodiment of the present invention, the second adhesive member has a first thickness and a second thickness, and the second thickness is greater than the first thickness, and the portion of the second adhesive member with the second thickness is located in the elongated slot of the fourth optical film.

According to an embodiment of the present invention, a thickness of the fourth optical film is substantially equal to the second thickness minus the first thickness.

According to an embodiment of the present invention, the display panel is adhered on the second adhesive member.

According to an embodiment of the present invention, the back plate further comprises a carrying portion which has a carrying surface. Each of the first optical film, the second optical film, the third optical film and the fourth optical film has a notch corresponding to the carrying portion.

According to an embodiment of the present invention, the back plate further comprises a carrying portion which has a carrying surface. Each of the first optical film and the second optical film has a notch corresponding to the carrying portion.

According to an embodiment of the present invention, the backlight module further comprises a second adhesive member adhered on the carrying surface, in which the display panel is adhered on the second adhesive member.

According to an embodiment of the present invention, the back plate further comprises a sidewall, and the carrying portion is a bent portion extending from the sidewall towards an inner side of the back plate, and the bent portion is located in the notches.

According to an embodiment of the present invention, the back plate has a first extending direction and a second extending direction vertical to each other. The carrying portion is disposed on a corner portion of the back plate. The carrying portion comprises a first carrying unit and a second carrying unit respectively disposed along the first extending direction and the second extending direction.

According to the aforementioned object, another backlight module is provided. The backlight module includes a first optical film, an adhesive member, a second optical film and a light source. The first optical film has an elongated slot. One portion of the adhesive member is disposed in the elongated slot. The second optical film is disposed above or under the first optical film, in which a portion of the second optical film overlaps the elongated slot of the first optical film so as to be adhered on the portion of the adhesive member which is located in the elongated slot. Light emitted from the light source forms a plane light source after passing through the first optical film and the second optical film.

According to the aforementioned object, another display device is provided. The display device includes a backlight module and a display panel. The display panel is disposed in front of the first optical film and the second optical film.

From the aforementioned embodiments of the present invention, it can be known that an elongated slot is disposed on the at least one optical film for receiving a portion of the adhesive member. Therefore, not only the adhesive member itself is adhered to the optical film having the elongated slot, but also the portion of the adhesive member located in the elongated slot is adhered to other components in the backlight module or the display panel, thereby reducing overall thickness of backlight module and the display device.

On the other hands, the back plate of the present invention has the carrying portion, such that the display panel is firmly held on the carrying portion. Moreover, the optical film has the notch which is corresponding to the carrying portion and is configured to receive the carrying portion, thereby increasing the carrying area of the display panel without needing to increase the frame border width and without affecting the area of the display area, thus increasing the reliability of holding the display panel on the back plate.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
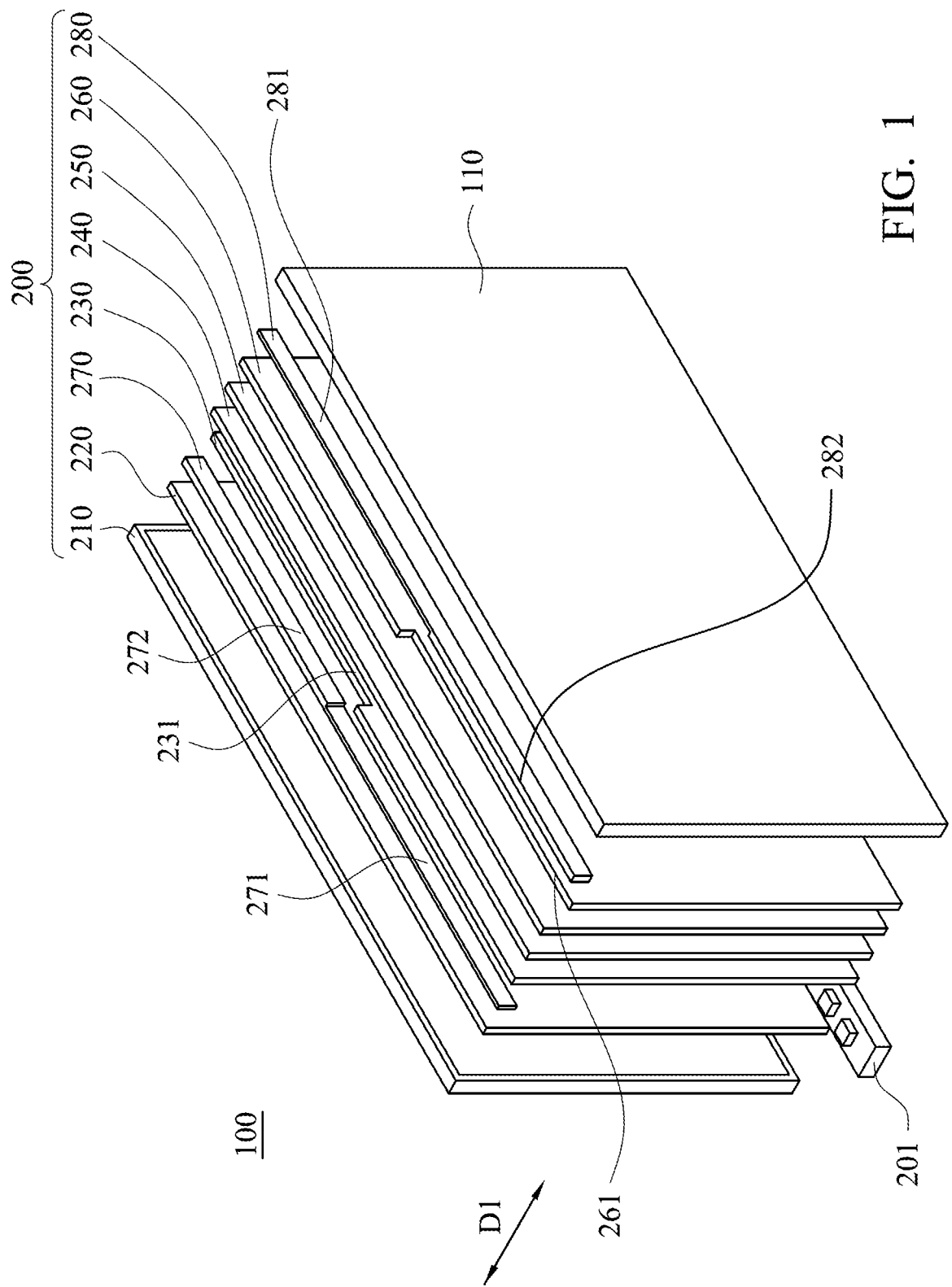
FIG. 1 is a schematic partial exploded view of a display device in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

It is noted that, spatially relative terms in the following embodiments, such as "above," "upper", "front", "rear", "left" and "right" or the like, may be used herein for ease of description to describe one element or feature's relationship to another element(s) or feature(s) as illustrated in the figures.

Figure 2:
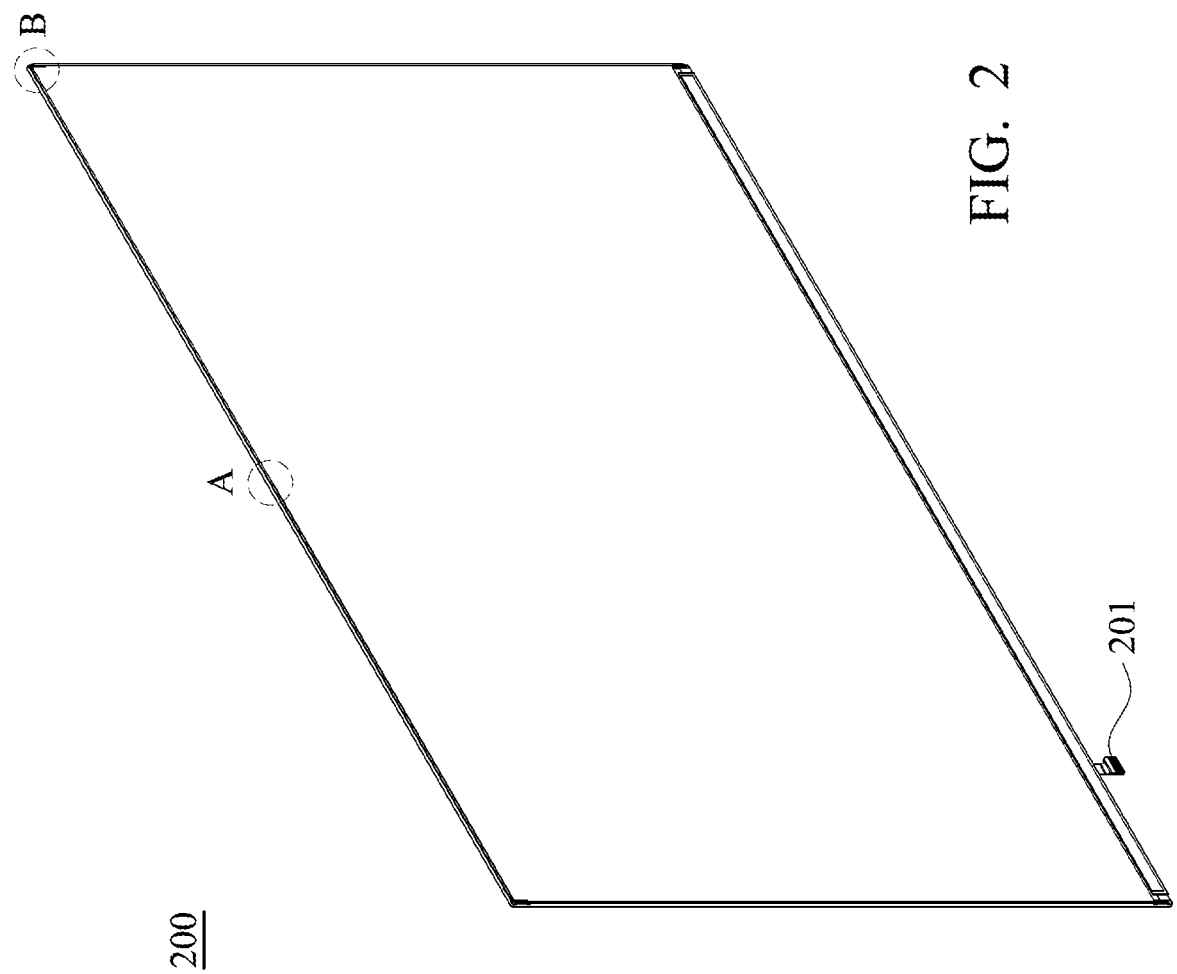
FIG. 2 is a schematic structural diagram showing a backlight module in accordance with the first embodiment of the present invention.

Referring to FIG. 1 and FIG. 2, FIG. 1 is a schematic partial exploded view of a display device 100 in accordance with a first embodiment of the present invention, and FIG. 2 is a schematic structural diagram showing a backlight module 200 in accordance with the first embodiment of the present invention. The display device 100 of the present embodiment mainly includes a backlight module 200 and a display panel 110. The backlight module 200 mainly includes a back plate 210, a light guide plate 220, a first optical film 230, a second optical film 240, a third optical film 250, a fourth optical film 260, a first adhesive member 270, a second adhesive member 280 and a light source 201. The light guide plate 220 and the light source 201 are disposed in the back plate 210, and the light source 201 is disposed adjacent to a light-incident surface of the light guide plate 220. The first optical film 230, the second optical film 240, the third optical film 250 and the fourth optical film 260 are sequentially disposed above the light guide plate 220. The first adhesive member 270 is mainly used to adhere the first optical film 230 and the second optical film 240 to the light guide plate 220. The second adhesive member 280 is used to adhere the third optical film 250 to fourth optical film 260 as well as to adhere the display panel 110 on the back plate 210.

Simultaneously referring to FIG. 1 and FIG. 3A-FIG. 3F, in which FIG. 3A-FIG. 3F are schematic diagrams showing a process for assembling the backlight module 200 in accordance with the first embodiment of the present invention. It is noted that, the process shown in the FIG. 3A-FIG. 3F is merely used as an example for explaining the relationship between elements, and other embodiments of the present invention are not limited thereto. The assembling process of the backlight module can be varied according to different requirements. It should be noted that FIG. 3A-FIG. 3F are schematic diagrams showing an enlarged portion labeled with detail "A" in FIG. 2.

Figure 3A:
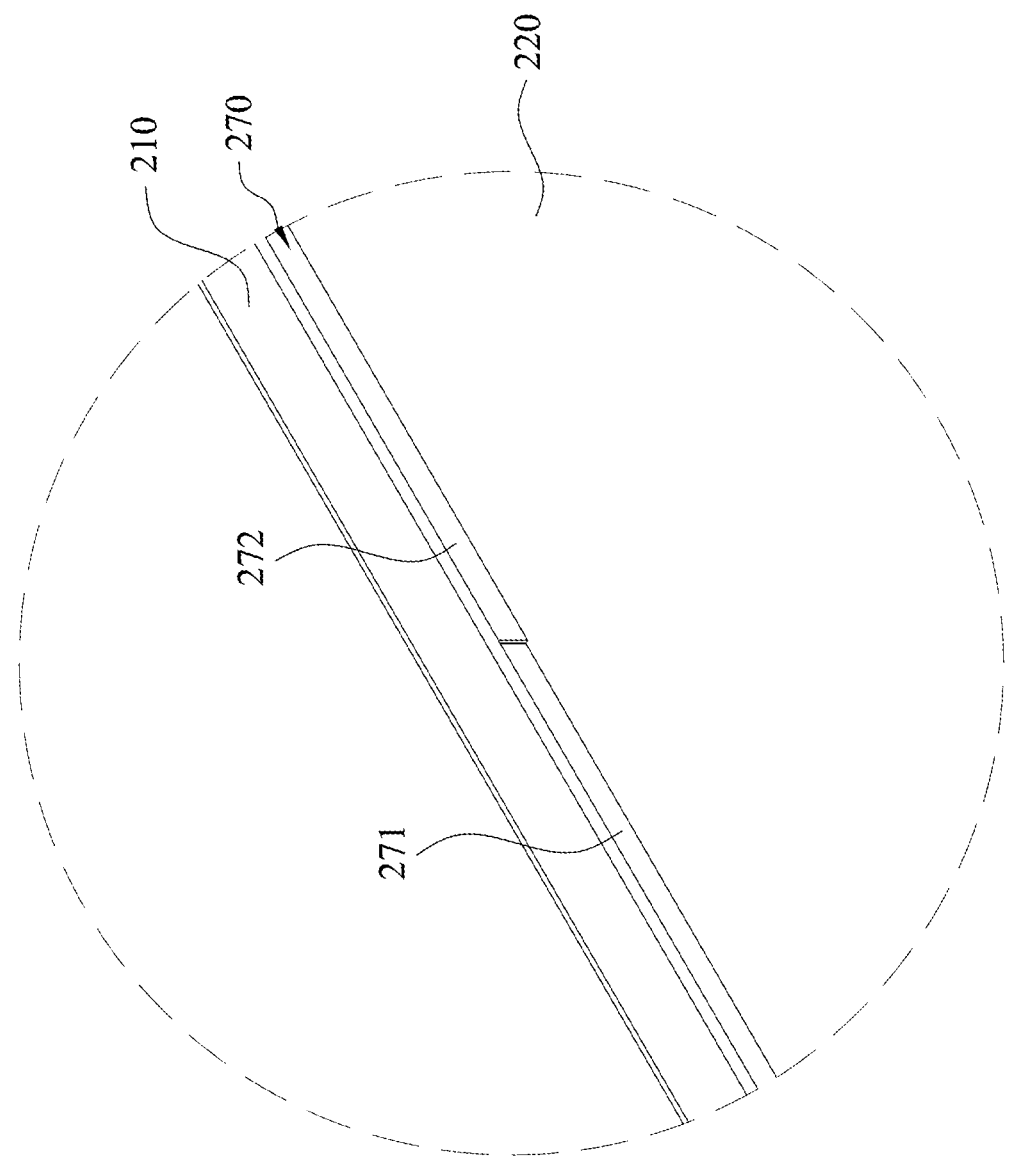
FIG. 3A-FIG. 3F are schematic diagrams showing a process for assembling the backlight module in accordance with the first embodiment of the present invention.

Simultaneously referring to FIG. 1 and FIG. 3A, in the assembling process, after the light guide plate 220 is disposed in the back plate 210, the first adhesive member 270 is adhered to the light guide plate 220. In one embodiment, the first adhesive member 270 is a double-sided adhesive tape with different thicknesses. The first adhesive member 270 has a first portion 271 and a second portion 272. The first portion 271 has a first thickness, and the second portion 272 has a second thickness, in which the second thickness is greater than the first thickness.

Figure 3B:
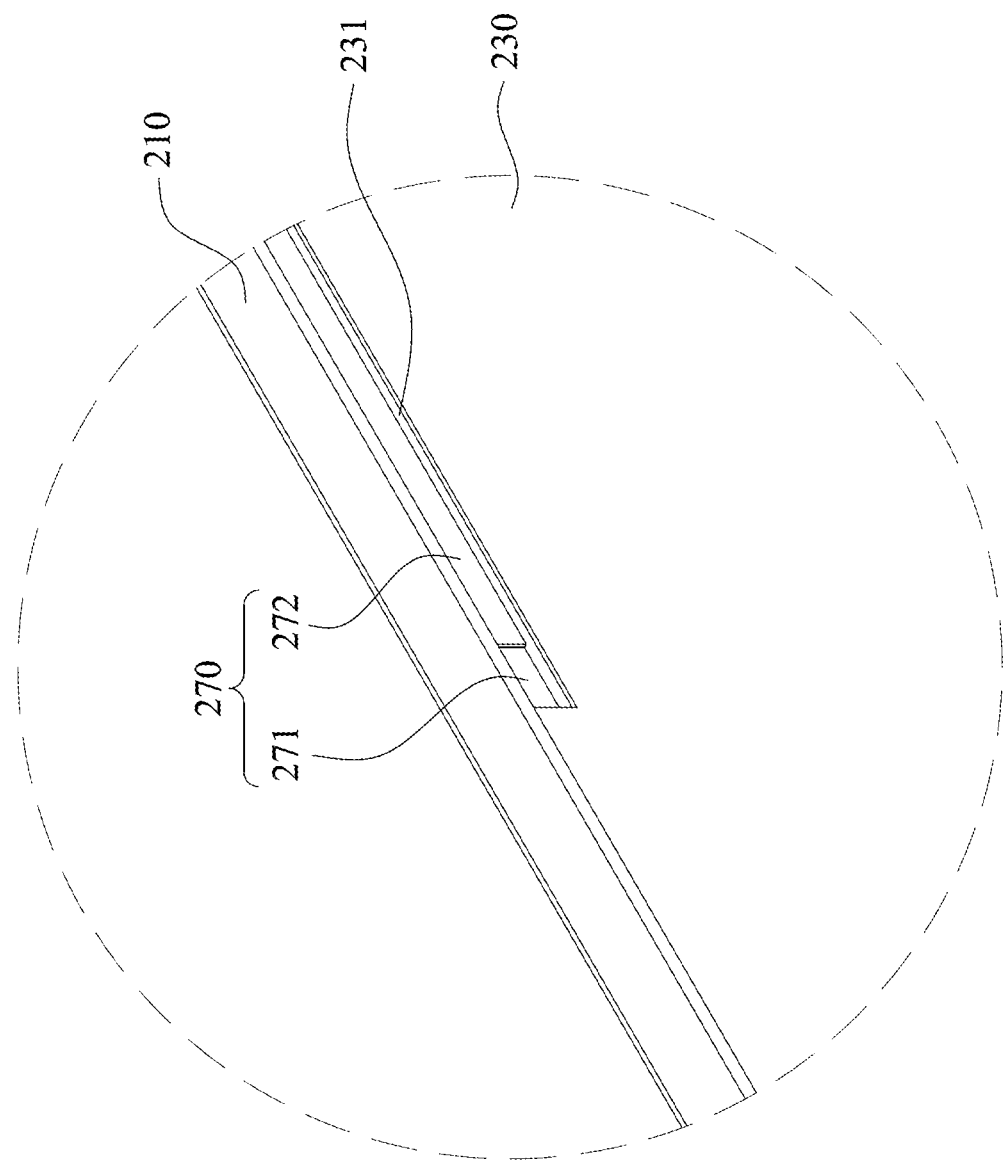

Referring to FIG. 1 and FIG. 3B, after the light guide plate 220 and the first adhesive member 270 is disposed on the back plate 220, the first optical film 230 is disposed on the light guide plate 220 and is adhered to the first portion 271 of the first adhesive member 270. In other words, the first portion 271 of the first adhesive member 270 is adhered to a top surface of the light guide plate 220 and a bottom surface of the first optical film 230. In the present embodiment, the first optical film 230 has an elongated slot 231, and the elongated slot 231 extends along a side edge of the light guide plate 220. When the first optical film 230 is adhered to the first portion 271 of the first adhesive member 270, the elongated slot 231 is used to receive the second portion 272 of the first adhesive member 270. In one embodiment, a thickness of the first optical film 230 is substantially equal to the second thickness of the first adhesive member 270 minus the first thickness of the first adhesive member 270. Therefore, when the first optical film 230 is adhered to the first adhesive member 270, a top surface of the second portion 272 of the first adhesive member 270 and a top surface of the first optical film 230 are substantially coplanar.

Figure 3C:
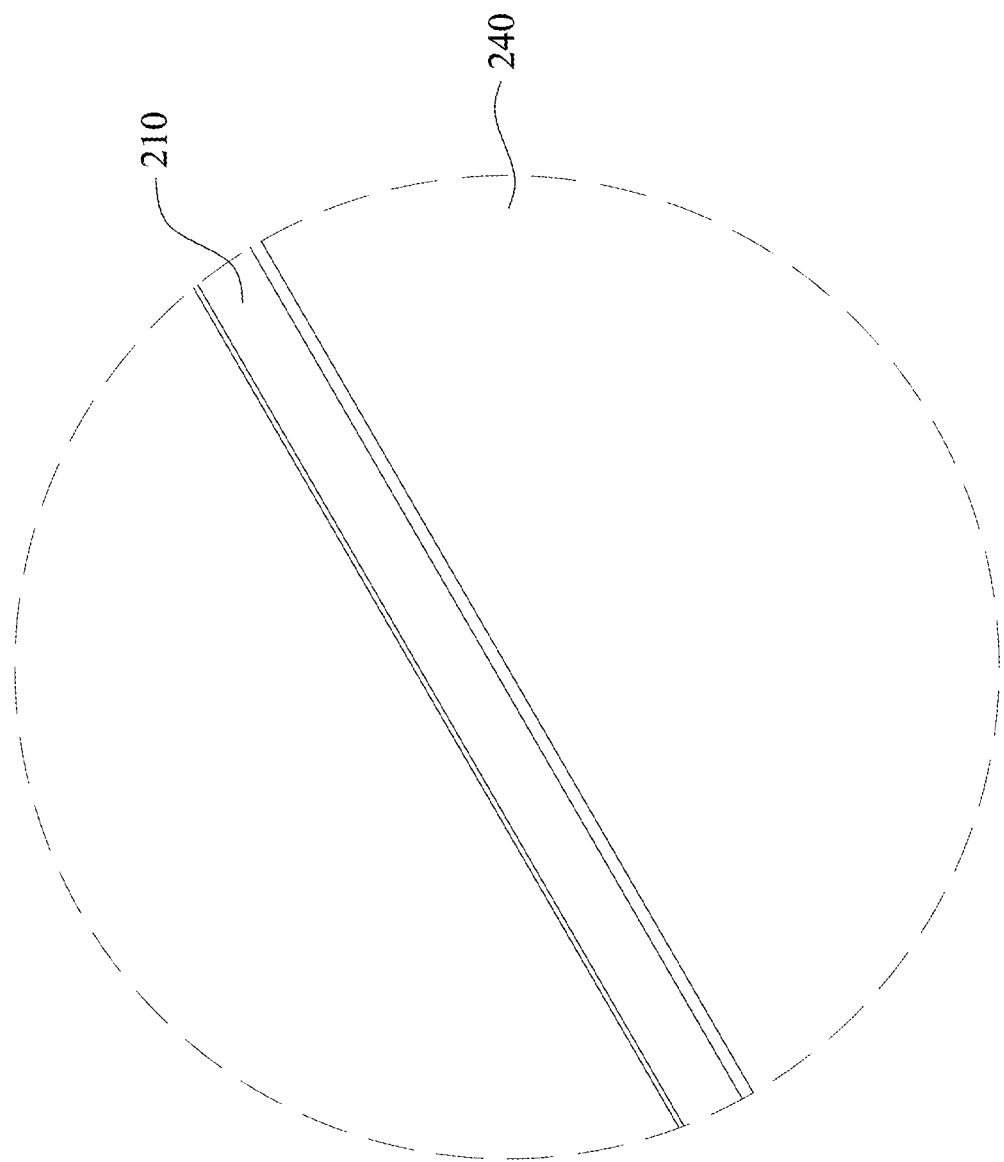

Simultaneously referring to FIG. 1, FIG. 3B and FIG. 3C, after the first adhesive member 270 is adhered on the first optical film 230, the second optical film 240 is adhered on the first optical film 230. In the present embodiment, one portion of the second optical film 240 overlaps the elongated slot 231 of the first optical film 230, so as to be adhered to the second portion 272 of the first adhesive member 270. In other words, the second portion 272 of the first adhesive member 270 located in the elongated slot 231 is adhered to the top surface of the light guide plate 220 as well as the bottom surface of the first optical film 230. In addition, when the top surface of the second portion 272 and the top surface of the first optical film 230 are substantially coplanar, a bottom surface of the second optical film 240 can be adhered to the second portion 272 of the first adhesive member 270 and the first optical film 230 simultaneously.

Figure 3D:
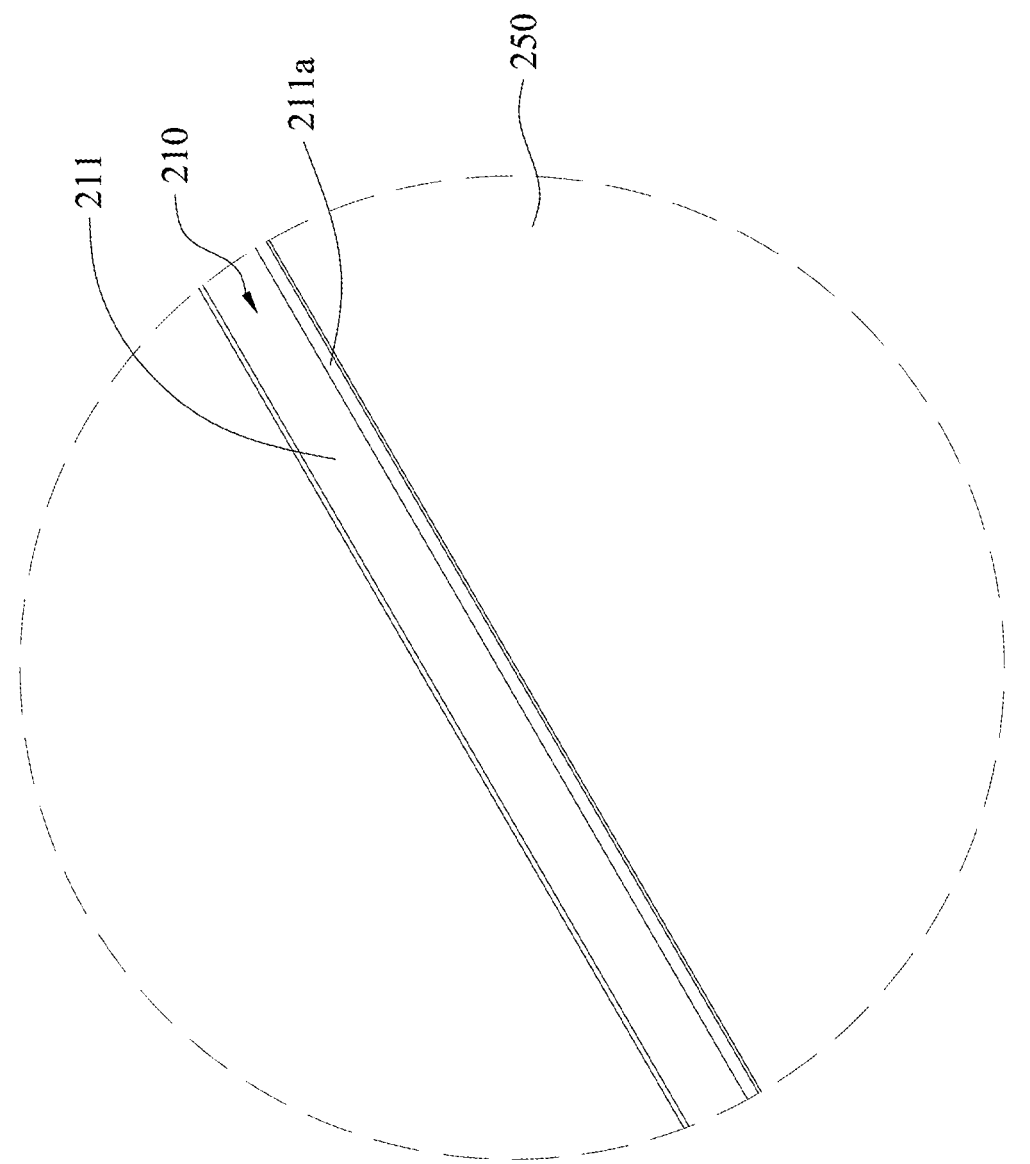

Referring to FIG. 1 and FIG. 3D, after the second optical film 240 is adhered on the first optical film 230, the third optical film 250 is placed on the second optical film 240. In one embodiment, when the third optical film 250 is placed on the second optical film 240, a top surface of the third optical film 250 is aligned with a top surface 211a of the sidewall 211 of the back plate 210.

Figure 3E:
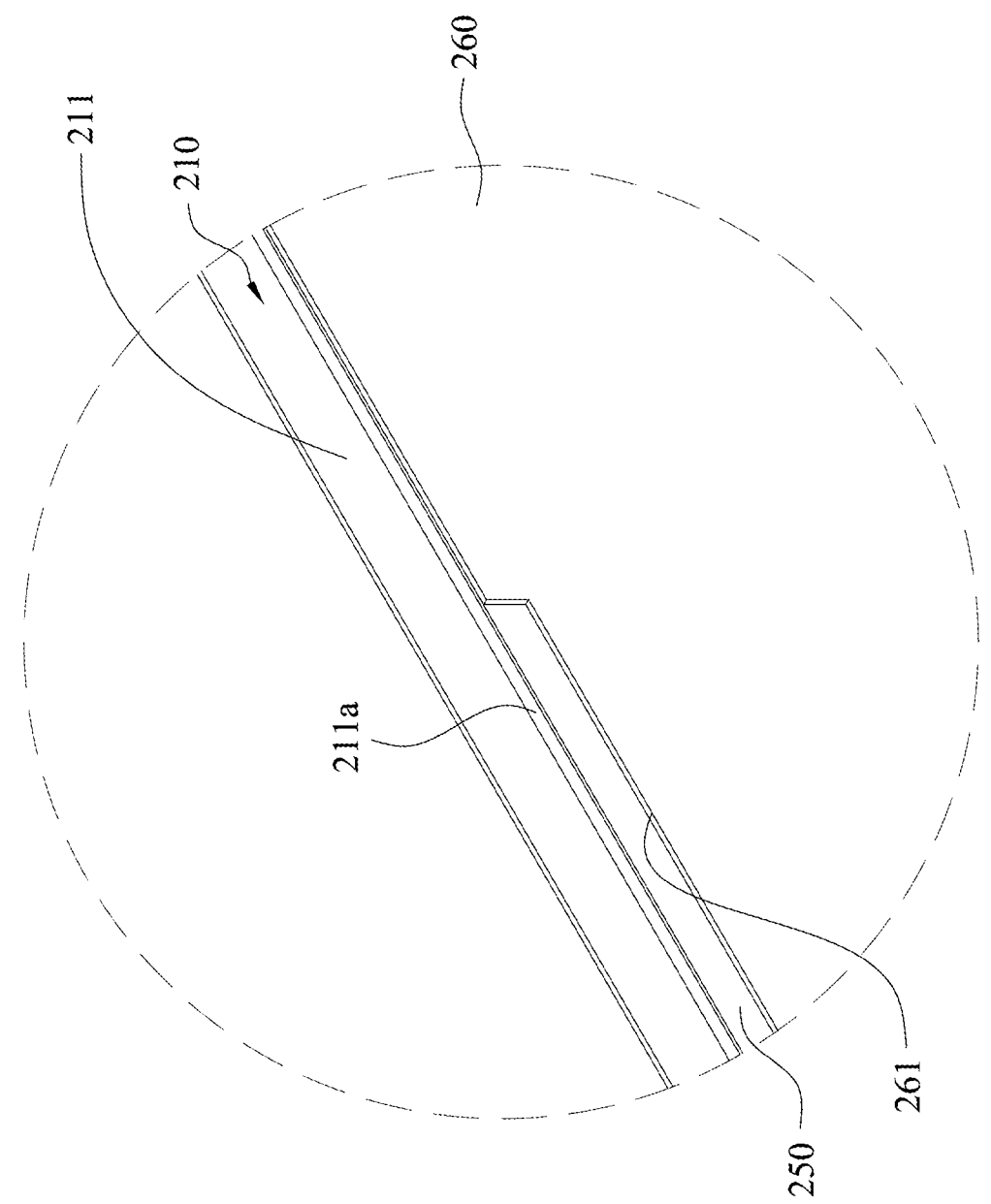

Referring to FIG. 1 and FIG. 3E, after the third optical film 250 is placed on the second optical film 240, the fourth optical film 260 is disposed on the third optical film 250. In one embodiment, the fourth optical film 260 has an elongated slot 261 which extends along the side edge of the light guide plate 220. When the fourth optical film 260 is disposed on the third optical film 250, the elongated slot 261 is used to receive a portion of the second adhesive member 280. As shown in FIG. 1, the elongated slot 231 of the first optical film 230 and the elongated slot 261 of the fourth optical film 260 are alternatively arranged along a thickness direction D1 of the light guide plate 220.

Figure 3F:
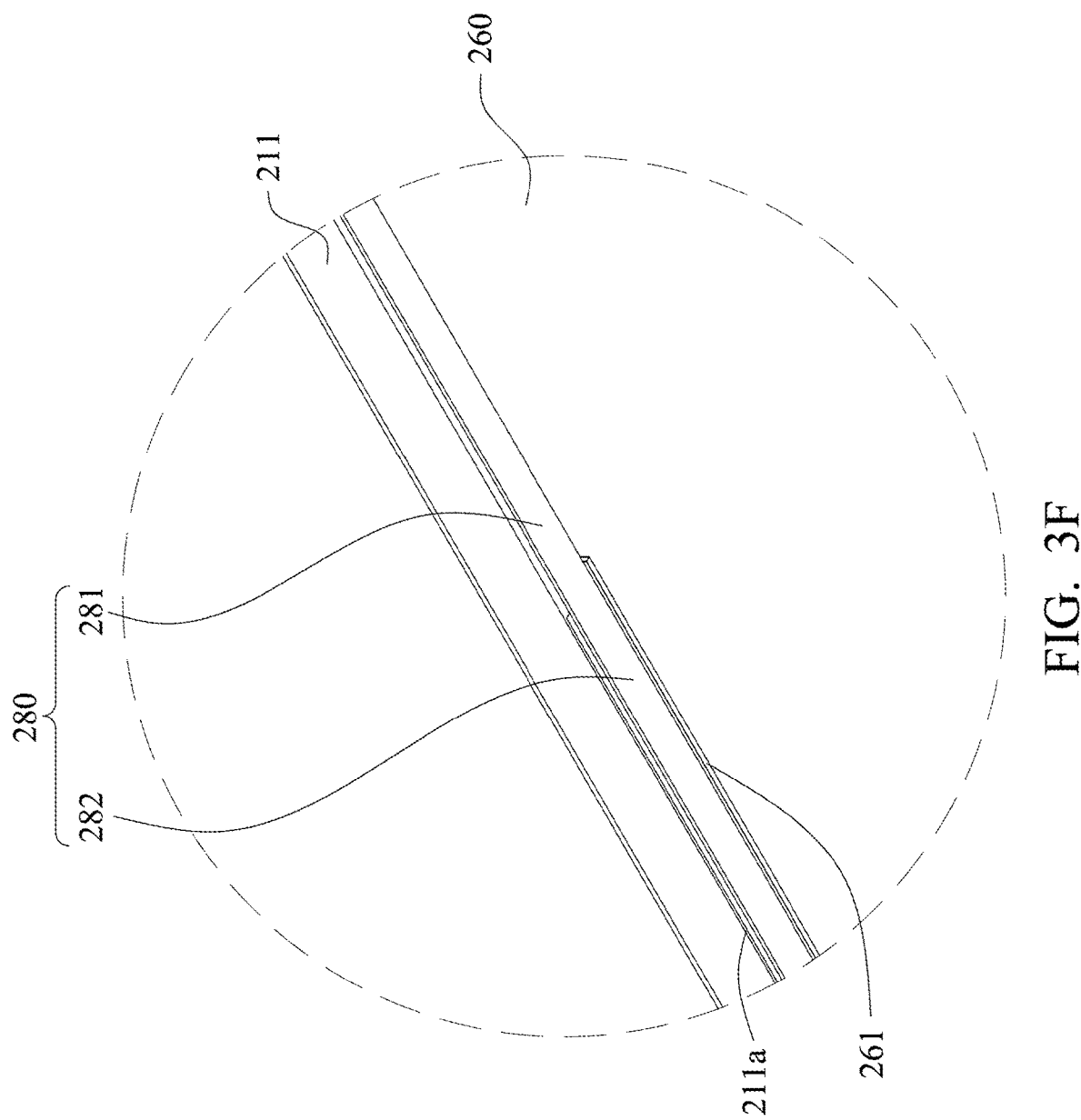

Referring to FIG. 1 and FIG. 3F, after the fourth optical film 260 is disposed on the third optical film 250, the second adhesive member 280 is adhered to the fourth optical film 260 and the third optical film 250 simultaneously. More specifically, the second adhesive member 280 is a double-sided adhesive tape with different thicknesses. The second adhesive member 280 has a first portion 281 and a second portion 282. The first portion 281 has a first thickness, and the second portion 282 has a second thickness, in which the second thickness is greater than the first thickness. In one embodiment, a thickness of the fourth optical film 260 is substantially equal to the second thickness minus the first thickness of the member 280. Therefore, when the second adhesive member 280 is adhered on the fourth optical film 260, the second portion 282 of the second adhesive member 280 is received in the elongated slot 261 of the fourth optical film 260 so as to be adhered to the third optical film 250 and the top surface 211a of the sidewall 211. In addition, after the second adhesive member 280 is adhered on the fourth optical film 260, the display panel 110 can be held on the back plate 210 to be adhered on the second adhesive member 280. In the present embodiment, the first optical film 230 is a lower diffuser, the second optical film 240 is a lower prism sheet, the third optical film 250 is an upper prism sheet, and the fourth optical film 260 is an upper diffuser. In the present embodiment, elongated slots are respectively disposed on the lower diffuser and the upper diffuser. In other embodiments, elongated slots also can be respectively disposed on the lower prism sheet and the upper prism sheet in according to different requirements. Therefore, the spirit and scope of the appended claims should not be limited to the description of the embodiments contained herein.

Figure 4:
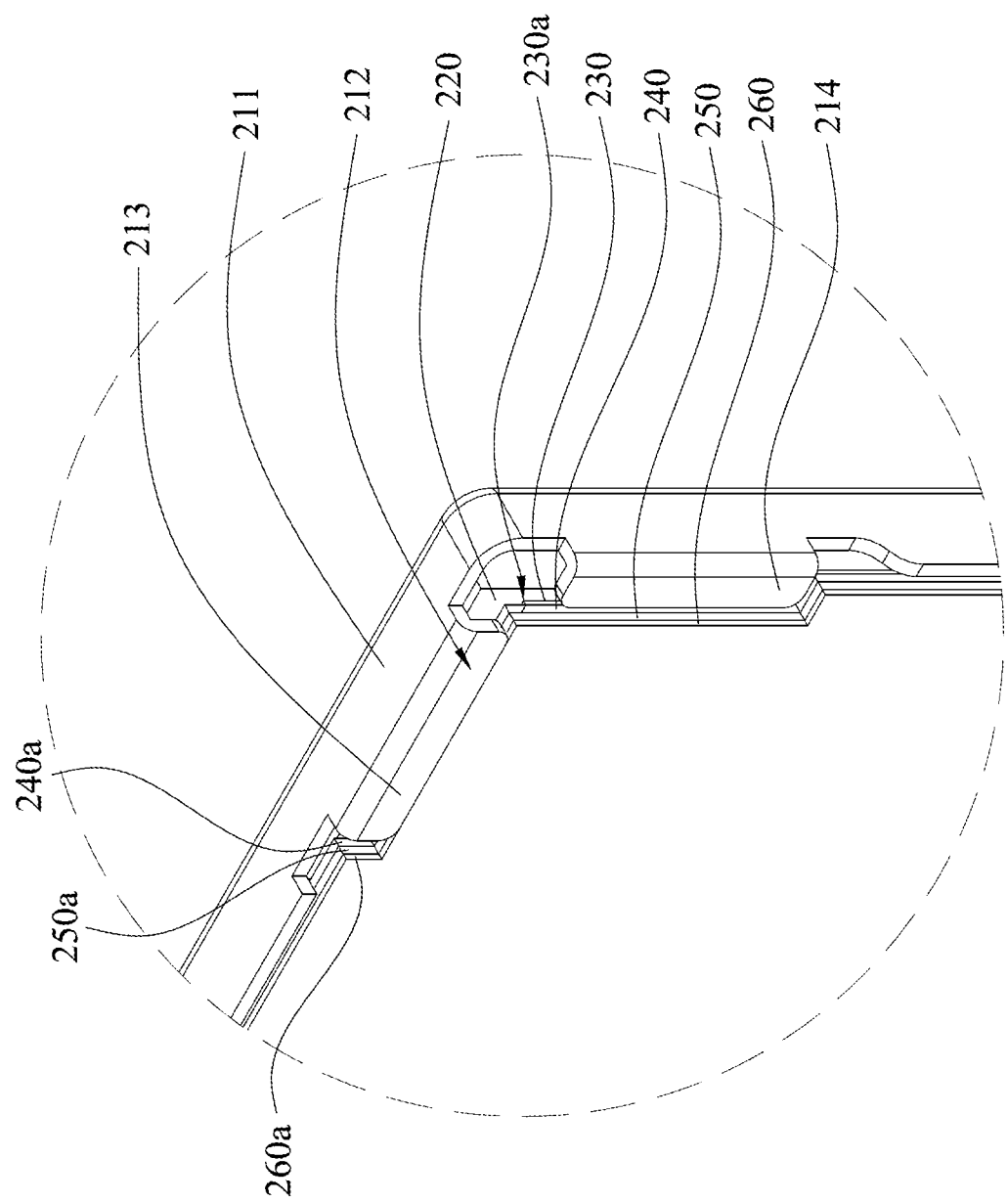
FIG. 4 is a schematic structural diagram showing a backlight module without a second adhesive member disposed thereon in accordance with a second embodiment of the present invention.
Figure 5:
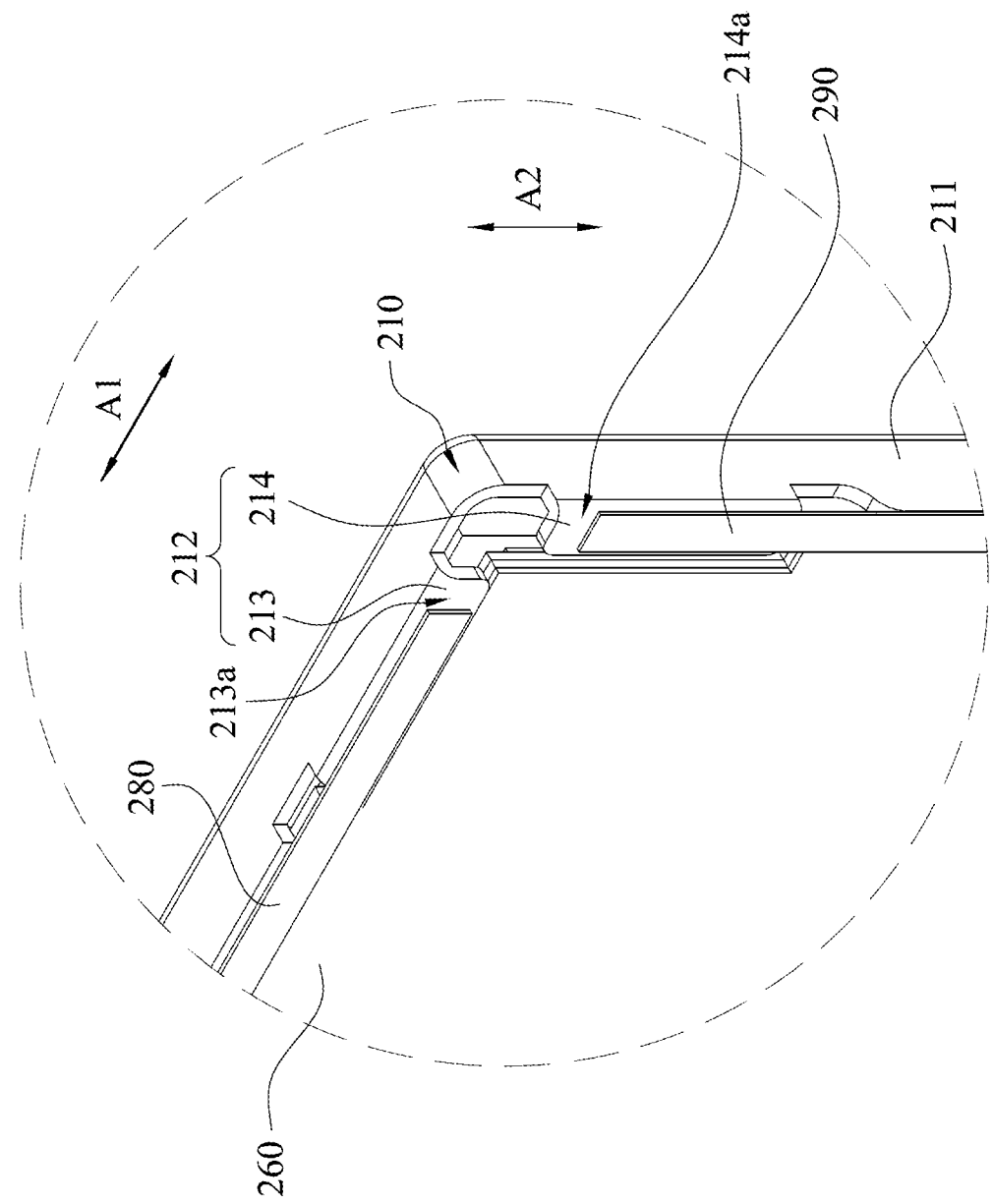
FIG. 5 is a schematic structural diagram showing the backlight module with a second adhesive member disposed thereon in accordance with the second embodiment of the present invention.

Referring to FIG. 1, FIG. 4 and FIG. 5, FIG. 4 is a schematic structural diagram showing the backlight module 200 without the second adhesive member 280 disposed thereon in accordance with a second embodiment of the present invention, and FIG. 5 is a schematic structural diagram showing the backlight module 200 with the second adhesive member 280 disposed thereon in accordance with the second embodiment of the present invention. It should be noted that FIG. 4 and FIG. 5 are schematic diagrams showing an enlarged portion labeled with detail "B" in FIG. 2. In some embodiments, the back plate 210 includes a carrying portion 212. The carrying portion 212 is mainly used to support the display panel 110 and to position the first optical film 230, the second optical film 240, the third optical film 250 and the fourth optical film 260.

In one embodiment, as shown in FIG. 4, the carrying portion 212 is a bent portion which extends from a portion of the sidewall 211 of the back plate 210 towards the inner side of the back plate 210. In other embodiments, the carrying portion 212 can be a PET plastic spacer which is mounted to the back plate 210, or a portion of a mold frame of the backlight module 200. The bent portion extending from the sidewall 211 towards the inner side of the back plate 210 and the plastic spacer mounted on the back plate 210 can be used to replace the conventional mold frame, thereby reducing the overall width of the frame of the backlight module to meet the design requirement of the narrow border display device. In addition, the light guide plate 220, the first optical film 230, the second optical film 240, the third optical film 250 and the fourth optical film 260 are disposed inside the sidewall, and the light guide plate 220 is disposed under the carrying portion 212. In the present embodiment, the first optical film 230 has a notch 230a, the second optical film 240 has a notch 240a, the third optical film 250 has a notch 250a, and the fourth optical film 260 has a notch 260a. The carrying portion 212 is correspondingly received in the notch 230a, the notch 240a, the notch 250a and the notch 260a. Because the carrying portion 212 is received in the notch 230a, the notch 240a, the notch 250a and the notch 260a, a carrying area of the display panel 110 can be increased without needing to increase the overall border width of the backlight module 200.

Simultaneously referring to FIG. 1, FIG. 3F and FIG. 5, in one embodiment, the carrying portion 212 is disposed on a corner portion of the back plate 210. The carrying portion 212 includes a first carrying unit 213 extending along the first extending direction A1 and a second carrying unit 214 extending along the second extending direction A2. The first carrying unit 213 has a carrying surface 213a, and the second carrying unit 214 has a carrying surface 214a. In one example, the first extending direction A1 is vertical to the second extending direction A2. In other words, the carrying portion 212 is an L-shaped structure which is a sectional type structure as shown in FIG. 5. In other embodiments, the L-shaped structure may be an integral type structure. Moreover, the notches of the first optical film 230, the second optical film 240, the third optical film 250 and the fourth optical film 260 can be designed to be an L-shaped notch (as shown in FIG. 4 and FIG. 5) corresponding to the L-shaped carrying portion 212. Therefore, corner portions of the display panel 110 can be supported by the first carrying unit 213 and the second carrying unit 214.

As shown in FIG. 3F, the second portion 282 of the second adhesive member 280 is located in the elongated slot 261 of the fourth optical film 260 and is adhered to the top surface 211a of the sidewall 211. As shown in FIG. 3 and FIG. 5, the first portion 281 of the second adhesive member 280 is adhered to the fourth optical film 260 as well as the carrying surface 213a of the first carrying unit 213. Therefore, the second adhesive member 280 is able to adhere the third optical film 250 and the fourth optical film 260 to the back plate 210 and fix the display panel 110. In some embodiments, as shown in FIG. 5, a third adhesive member 290 can be used to be adhered on the carrying surface 214a of the second carrying unit 214, the fourth optical film 260 and the top surface 211a of the sidewall 211 along the second extending direction A2, thereby fixing the fourth optical film 260 firmly. Similarly, when the display panel 110 is adhered on the second adhesive member 280, the third adhesive member 290 is adhered to the display panel 110 at the same time.

Figure 6:
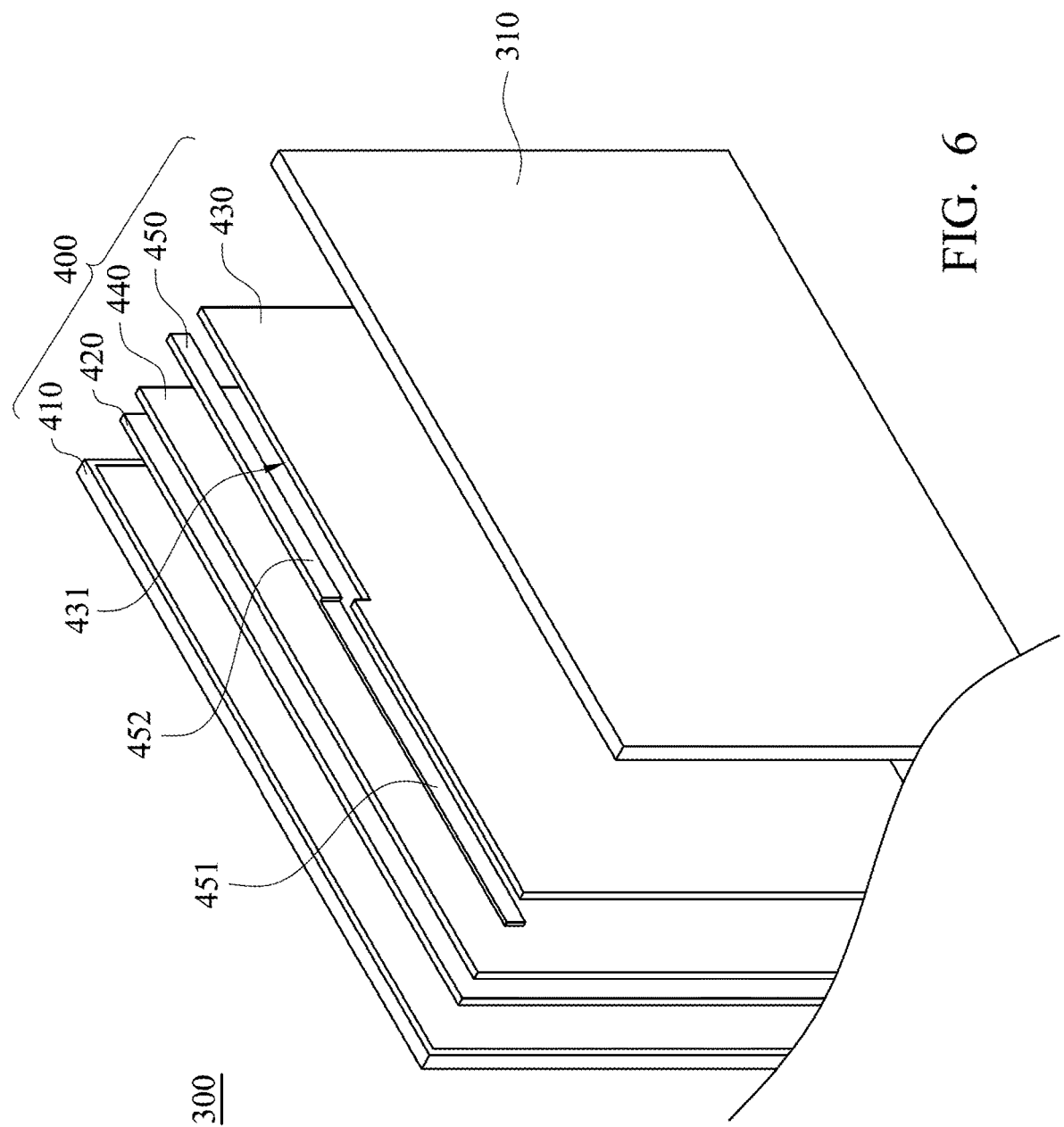
FIG. 6 is a schematic partial exploded view of a display device in accordance with a third embodiment of the present invention.

In the present invention, the number of optical films is not limited to four as shown in the aforementioned embodiments, and the location of the second optical film is not limited to be disposed above the first optical film. Referring to FIG. 6, FIG. 6 is a schematic partial exploded view of a display device 300 in accordance with a third embodiment of the present invention. As shown in FIG. 6, the display device 300 of the present embodiment includes a backlight module 400 and a display panel 310. The backlight module 400 mainly includes a back plate 410, a light guide plate 420, a first optical film 430, a second optical film 440, an adhesive member 450 and a light source (not shown). The light guide plate 420 and the light source are disposed in the back plate 410. The light source is disposed adjacent to a light-incident surface of the light guide plate 420. The adhesive member 450 is mainly used to simultaneously adhere the first optical film 430 to the second optical film 440 as well as to adhere the display panel 310 on the back plate 410.

Referring to FIG. 6 again, the second optical film 440 of the present embodiment is disposed between the light guide plate 420 and the first optical film 430. In the present embodiment, the adhesive member 450 is a double-sided tape with different thicknesses. The adhesive member 450 has a first portion 451 and a second portion 452. The first portion 451 has a first thickness, and the second portion 452 has a second thickness, in which the second thickness is greater than the first thickness. As shown in FIG. 6, the first optical film 430 has an elongated slot 431. The first portion 451 of the adhesive member 450 is adhered between the first optical film 430 and the second optical film 440, and the second portion 452 of the adhesive member 450 is received in the elongated slot 431 to be adhered to the display panel 310, such that the display panel 310 can be firmly adhered on the back plate 410.

In other embodiments, the back plate 410 also can be implemented with the carrying portion 212 as shown in FIG. 4, so as to achieve the same objective of supporting the display panel 310, which will not be described again herein.

Figure 7:
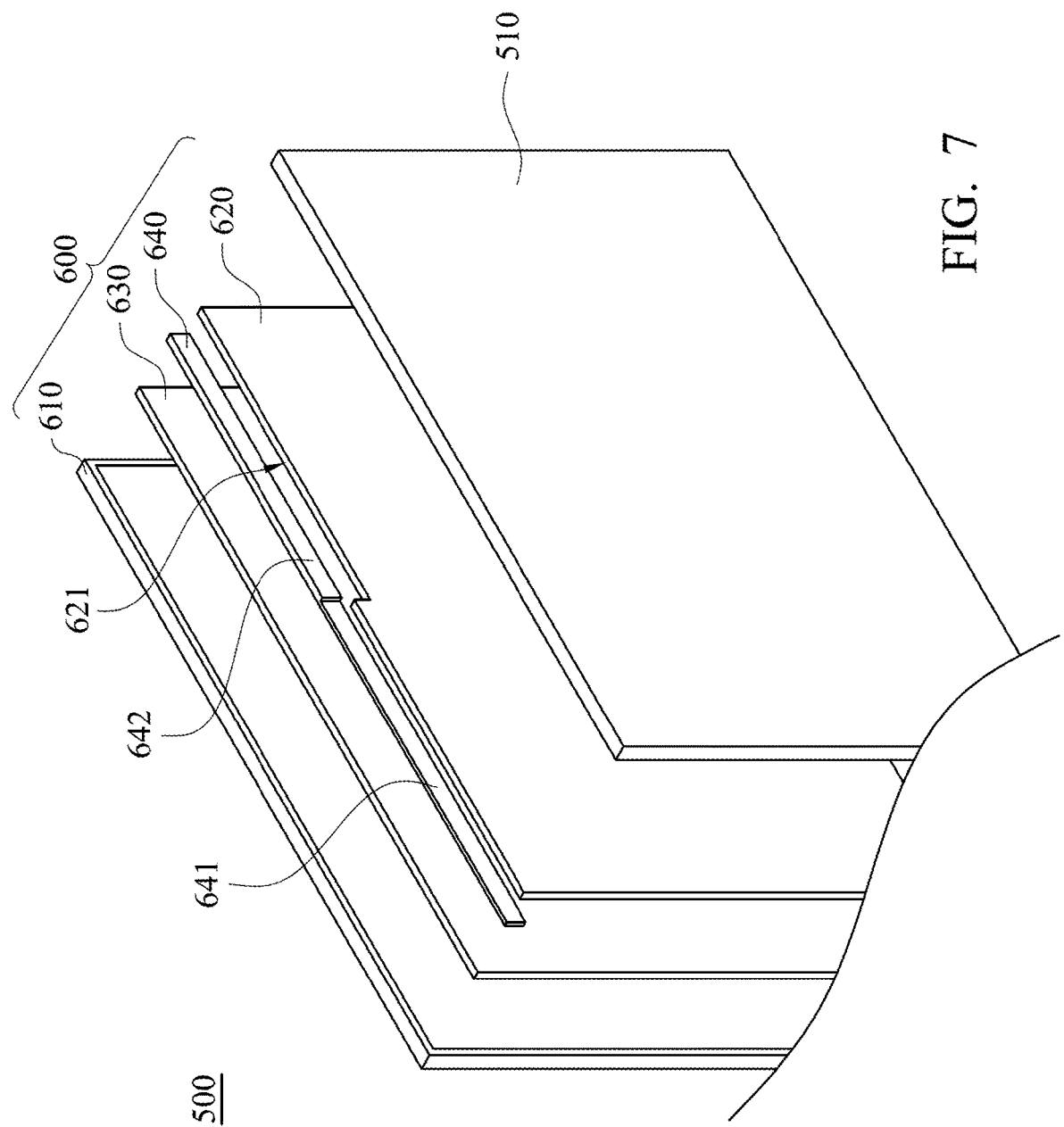
FIG. 7 is a schematic partial exploded view of a display device in accordance with a fourth embodiment of the present invention.

Referring to FIG. 7, FIG. 7 is a schematic partial exploded view of a display device 500 in accordance with a fourth embodiment of the present invention. As shown in FIG. 7, the display device 500 of the present embodiment includes a backlight module 600 and a display panel 510. The backlight module 600 mainly includes a back plate 610, a first optical film 620, a second optical film 630, an adhesive member 640 and a light source (not shown). The first optical film 620, the second optical film 630 and the light source are disposed in the back plate 610. In the present embodiment, the second optical film 630 is disposed between the first optical film 620 and the back plate 610. Light emitted from the light source forms a plane light source after passing through the first optical film 620 and the second optical film 630.

As shown in FIG. 7, the adhesive member 640 is used to adhere the first optical film 620 to the second optical film 630 as well as to adhere the display panel 510 to the back plate 610. In some embodiments, one of the first optical film 620 and second optical film 630 is a light guide plate, and the other one of the first optical film 620 and second optical film 630 is a turning film. In other embodiments, the backlight module 600 may not need a prism sheet or a diffuser additionally disposed thereon. In certain embodiments, a diffuser may be additionally disposed on the backlight module 600.

Referring to FIG. 7 again, in the present embodiment, the adhesive member 640 is adhered to the first optical film 620 and the second optical film 630 simultaneously. The adhesive member 640 is a double-sided tape with different thicknesses. In the present embodiment, the adhesive member 640 has a first portion 641 and a second portion 642. The first portion 641 has a first thickness, and the second portion 642 has a second thickness. The second thickness is greater than the first thickness. As shown in FIG. 7, the first optical film 620 has an elongated slot 621. The first portion 641 of the adhesive member 640 is adhered between the first optical film 620 and the second optical film 630, and the second portion 642 of the adhesive member 640 is received in the elongated slot 621 to be adhered to the display panel 510, such that the display panel 510 is fixed on the back plate 510 firmly.

In other embodiments, the back plate 610 also can be implemented with the carrying portion 212 as shown in FIG. 4, so as to achieve the same objective of supporting the display panel 510, which will not be described again herein.

From the aforementioned embodiments of the present invention, it can be known that an elongated slot is disposed on at least one optical film for receiving a portion of the adhesive member. Therefore, not only the adhesive member itself is adhered to the optical film having the elongated slot, but also the portion of the adhesive member located in the elongated slot is adhered to other components in the backlight module or the display panel, thereby reducing overall thickness of backlight module and the display device.

On the other hands, the back plate of the present invention has the carrying portion, such that the display panel is firmly held on the carrying portion. Moreover, the optical film has the notch which is corresponding to the carrying portion and is configured to receive the carrying portion, thereby increasing the carrying area of the display panel without needing to increase the frame border width and without affecting the area of the display area, thus increasing the reliability of holding the display panel on the back plate.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a back plate;
   a light guide plate disposed in the back plate;
   a first optical film disposed above the light guide plate, wherein the first optical film has an elongated slot;
   an adhesive member, wherein one portion of the adhesive member is disposed in the elongated slot;
   a second optical film disposed under the first optical film, and a portion of the second optical film overlaps the elongated slot of the first optical film so as to be adhered on the portion of the adhesive member which is located in the elongated slot; and
   a light source disposed on the back plate adjacent to a light-incident surface of the light guide plate;
   wherein the portion of the adhesive member located in the elongated slot is adhered to a top surface of the second optical film; and
   the other portion of the adhesive member is adhered to a bottom surface of the first optical film and the top surface of the second optical film.

2. The backlight module of claim 1, wherein the adhesive member has a first thickness and a second thickness, and the second thickness is greater than the first thickness, and the portion of the adhesive member with the second thickness is located in the elongated slot of the first optical film.

3. The backlight module of claim 2, wherein a thickness of the first optical film is substantially equal to the second thickness minus the first thickness.

4. A display device, comprising:
   a backlight module comprising:
      a back plate;
      a light guide plate disposed in the back plate;
      a first optical film disposed above the light guide plate, wherein the first optical film has an elongated slot;
      a first adhesive member, wherein one portion of the first adhesive member is disposed in the elongated slot;
      a second optical film disposed above or under the first optical film, and a portion of the second optical film overlaps the elongated slot of the first optical film so as to be adhered on the portion of the first adhesive member which is located in the elongated slot;
      a third optical film disposed above the second optical film;
      a fourth optical film disposed above the third optical film, wherein the fourth optical film has an elongated slot; and
      a second adhesive member, wherein one portion of the second adhesive member is disposed in the elongated slot of the fourth optical film, and the second adhesive member is adhered to the third optical film and the fourth optical film;
      wherein the elongated slot of the first optical film and the elongated slot of the fourth optical film are arranged along a side edge of the light guide plate, and are alternatively disposed along a thickness direction of the light guide plate;
      a light source disposed on the back plate adjacent to a light-incident surface of the light guide plate; and
   a display panel disposed in front of the light guide plate, the first optical film and the second optical film, wherein the display panel is held on the back plate.

5. The display device of claim 4, wherein
   the portion of the first adhesive member disposed in the elongated slot is adhered to a bottom surface of the second optical film and a top surface of the light guide plate;
   the other portion of the first adhesive member is adhered to a bottom surface of the first optical film and the top surface of the light guide plate.

6. The display device of claim 4, wherein the first adhesive member has a first thickness and a second thickness, and the second thickness is greater than the first thickness, and the portion of the first adhesive member with the second thickness is located in the elongated slot of the first optical film.

7. The display device of claim 6, wherein a thickness of the first optical film is substantially equal to the second thickness minus the first thickness.

8. The display device of claim 4, wherein the back plate further comprises a carrying portion which has a carrying surface, and the portion of the second adhesive member located in the elongated slot is adhered to a top surface of the third optical film ; and
   the other portion of the second adhesive member is adhered to a top surface of the fourth optical film and the carrying surface of the carrying portion.

9. The display device of claim 4, wherein the second adhesive member has a first thickness and a second thickness, and the second thickness is greater than the first thickness, and the portion of the second adhesive member with the second thickness is located in the elongated slot of the fourth optical film.

10. The display device of claim 9, wherein a thickness of the fourth optical film is substantially equal to the second thickness minus the first thickness.

11. The display device of claim 4, wherein the display panel is adhered on the second adhesive member.

12. The display device of claim 4, wherein
the back plate further comprises a carrying portion which has a carrying surface; and
each of the first optical film, the second optical film, the third optical film and the fourth optical film has a notch corresponding to the carrying portion.

13. The display device of claim 12, wherein the second adhesive member is adhered to the fourth optical film and the carrying surface, and the display panel is adhered on the second adhesive member.

14. The display device of claim 12, wherein the back plate further comprises a sidewall, and the carrying portion is a bent portion extending from the sidewall towards an inner side of the back plate, and the bent portion is located in the notches.

15. The display device of claim 12, wherein
the back plate has a first extending direction and a second extending direction vertical to each other;
the carrying portion is disposed on a corner portion of the back plate; and
the carrying portion comprises a first carrying unit and a second carrying unit respectively disposed along the first extending direction and the second extending direction.

16. The display device of claim 4, wherein
the back plate further comprises a carrying portion which has a carrying surface; and
each of the first optical film and the second optical film has a notch corresponding to the carrying portion.

17. The display device of claim 16, wherein the backlight module further comprises a second adhesive member adhered on the carrying surface, wherein the display panel is adhered on the second adhesive member.

18. A backlight module, comprising:
a first optical film having an elongated slot;
an adhesive member, wherein one portion of the adhesive member is disposed in the elongated slot;
a second optical film disposed under the first optical film, wherein a portion of the second optical film overlaps the elongated slot of the first optical film so as to be adhered on the portion of the adhesive member which is located in the elongated slot; and
a light source, wherein light emitted from the light source forms a plane light source after passing through the first optical film and the second optical film;
wherein the portion of the adhesive member located in the elongated slot is adhered to a top surface of the second optical film; and
the other portion of the adhesive member is adhered to a bottom surface of the first optical film and the top surface of the second optical film.

19. A display device, comprising:
a backlight module of claim 18, and
a display panel disposed in front of the first optical film and the second optical film.

* * * * *